Figure 1:
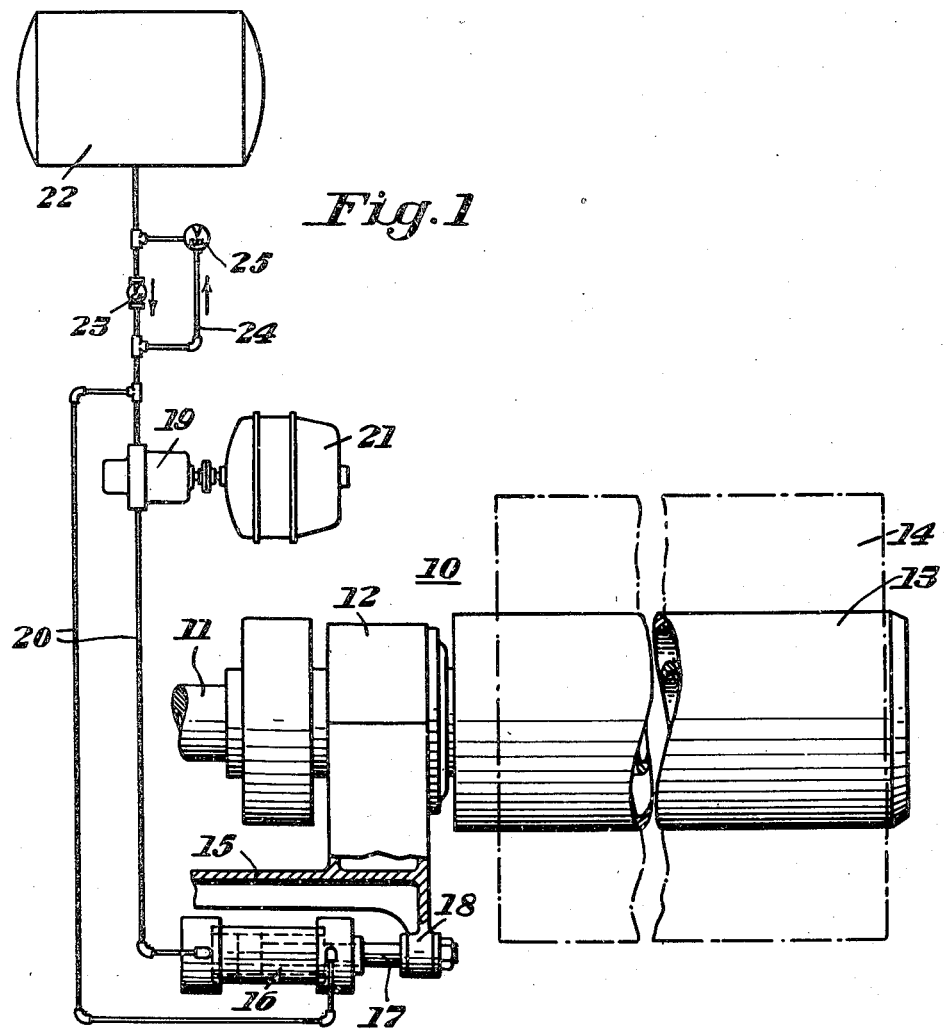

March 22, 1949.  W. O. JONES  2,464,932
COIL HOLDER OR REEL FOR STRIP-PROCESSING LINES
Filed Sept. 28, 1944  2 Sheets-Sheet 1

INVENTOR
Walter O. Jones
by his attorneys
Stebbins, Blenko & Webb

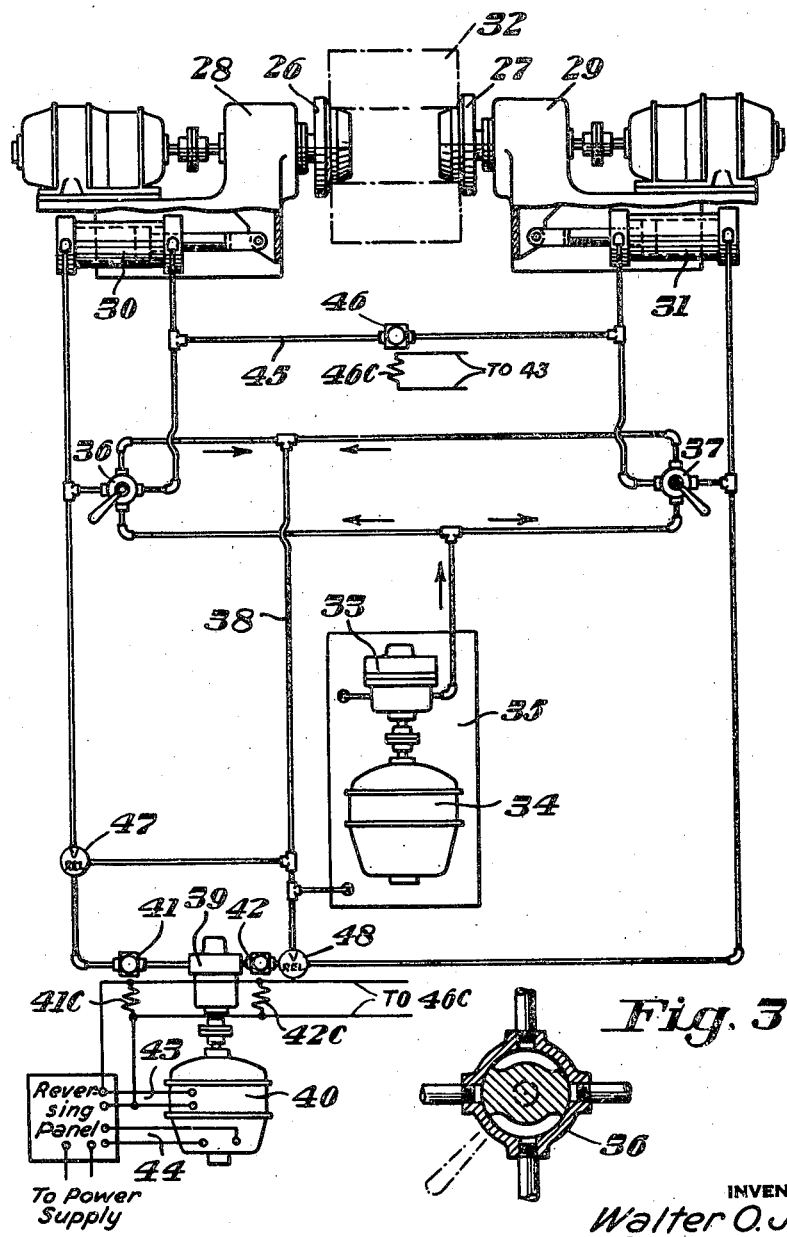

Patented Mar. 22, 1949

2,464,932

UNITED STATES PATENT OFFICE 2,464,932

COIL HOLDER OR REEL FOR STRIP-PROCESSING LINES

Walter O. Jones, Warren, Ohio, assignor to The Wean Engineering Company, Inc., Warren, Ohio, a corporation of Ohio Application September 28, 1944, Serial No. 556,258

3 Claims. (Cl. 242—76)

This invention relates to apparatus for holding a coil of strip as it is unwound preparatory to entering a processing line and recoiling the strip, if desired, as it leaves the processing line. In particular, the invention provides means for accurately positioning a coil holder or reel transversely of the processing line, to center a coil on the holder or reel relative thereto.

Sheet metal, and particularly steel, is now largely processed in strip form by passing it continuously through a line of apparatus adapted to perform the desired operations thereon successively. Examples are pickling lines, tinning lines and the like. In processing lines of this character, a coil of strip is unwound at the entry end of the line and, in some cases, recoiled at the delivery end of the line. Coil holders support the coils for unwinding at the entry end and coiling reels rewind the strip at the delivery end. In order to center the coil on a coil holder or the coil being formed on a reel, relative to the processing line, coil holders and reels, several types of which are known, have been constructed so they may be adjusted transversely of the processing line. Difficulty has been encountered, however, in accurately centering the coil on a holder or reel by the adjusting means available heretofore. It is obviously very important that accurate centering of the coil be obtained in order to insure proper "tracking" of the strip through the processing line which in many cases is quite long.

I have invented a novel apparatus for adjusting a coil holder or reel whereby a coil thereon may be properly centered with a processing line to a high degree of precision. In a preferred embodiment, I employ a hydraulic motor, such as a cylinder and piston, for actuating the holder or reel and supply fluid under pressure thereto from a special pump which is reversible. By employing a pump of suitable capacity relative to the volume of the cylinder, a fine adjustment of the holder or reel may be obtained by driving the motor for the required time in one direction or the other. A high ratio of pump revolutions per inch of travel of the coil holder is desirable to obtain the desired accuracy of control.

Further details, novel features and advantages of the invention will become apparent during the following complete description which refers to the accompany drawings illustrating a preferred embodiment and an alternate. In the drawings, Figure 1 is a diagrammatic view illustrating the invention as applied to a coil holder or reel of the overhung, expanding-mandrel type;

Figure 2 is a similar view showing the invention applied to a coil holder or reel of the opposed cone-head type; and Figure 3 is a section through a control valve shown on a reduced scale in Figure 2.

Referring in detail to the drawings and, for the present, to Figure 1, a coil holder or reel 10 comprises a shaft 11 journaled in suitable bearings, one of which is shown at 12, the shaft projecting beyond the bearing as a cantilever and being provided with an expanding mandrel 13 adapted to receive a coil of strip 14. The device 10 may be a coil holder or coiling reel. If the former, it is provided with a brake or other suitable restraining means for the shaft 11 to exert an initial back tension on the unwinding strip. If the device is a coiling reel, the shaft 11 is driven by a motor. In either case, the device is mounted on a base 15 which is slidable transversely of the center of the processing line with which the holder or reel is associated, for example, by being disposed on suitable supporting ways. A fluid-pressure cylinder 16 mounted on any suitable support has a piston reciprocable therein and a piston rod 17 connected to a boss 18 depending from the base 15. By this means the entire holder or reel may be shifted in an axial direction, i. e., transversely of the processing line.

A pump 19 is adapted to operate the cylinder 16 and has connections 20 to opposite ends thereof. The pump is of the reversible type, such as a gear pump, and, when driven, supplies fluid under pressure to one end of the cylinder and withdraws it from the other. The pump 19 may conveniently be driven by a reversible motor 21 of any suitable type. It will be apparent that if the pump 19 is of suitably capacity, the number of revolutions thereof required to move the piston rod 17 a unit distance, such as one inch, will be quite large. This permits precise centering of the coil 14 relative to the processing line by merely operating the motor 21 for a sufficient length of time in either direction. The smaller the capacity of the pump in relation to the volume of the cylinder 16, the longer the time required to center the coil. In view of the desirability of relatively speedy action, the capacity of the pump must be determined on the basis of a compromise between fineness of adjustment and speed of operation.

A reservoir 22 is connected to one side of the pump 19 through a check valve 23. This valve permits free passage of fluid from the reservoir to the pump but blocks the flow in the reverse direction. Thus when the pump 19 is delivering fluid to the left-hand end of the cylinder 16, make up fluid will be admitted to the pump through the valve 23 to supply the deficiency of fluid resulting from the fact that the piston rod 17 occupies a substantial volume in the right-hand end of the cylinder. A by-pass connection 24 has a relief valve 25 therein so that when the pump is delivering fluid to the right-hand end of the cylinder 16, the excess of fluid received from the left-hand end over that necessary to fill the space around the piston rod in the right-hand end may flow back to the reservoir 22. The valve 25, of course, is set to open at a pressure somewhat above that normally required to cause movement of the piston in the cylinder.

Figure 2 illustrates a coil holder or reel including a pair of opposed cone heads 26 and 27 mounted on shafts journaled in housings 28 and 29 adjustable transversely of the center of a processing line by means of fluid pressure cylinders 30 and 31. A coil holder of this type is caused to engage a coil, such as that indicated at 32, by movement of the heads 26 and 27 toward the coil from retracted positions while the coil is supported with its "eye" in alinement with the common axis of the heads.

In order to effect the simultaneous retraction and advance of the heads, I provide a pump 33 driven by any convenient means, such as the motor 34. The pump is adapted to deliver fluid from a reservoir 35, which may also serve as a base for mounting the pump and motor, to either end of the cylinders under the control of fourway valves 36 and 37. Figure 3 illustrates the interior construction of one of the valves. It will be apparent without further explanation by observing the connections between the pump, valves and the cylinders that clockwise rotation of the handle of the valve 36, for example, through an angle of 45° will connect the discharge side of the pump to the left-hand end of the cylinder 30 and right-hand end of the cylinder to a return line 38, thus causing movement of the head 26 toward the right. Movement of the valve handle in the other direction effects reverse movement of the head. The valve 37 similarly controls the cylinder 31 and head 27. By means of the valves, therefore, the heads may be caused to engage the coil and support it properly for unwinding.

It would be exceedingly difficult, if not impossible, to manipulate the valves 36 and 37 so as to center the coil properly without grave danger of dropping the coil. Accuracy of position, furthermore, is not readily obtained by this mode of operation. Accordingly, I provide a reversible pump 39 driven by a motor 40. I also provide means whereby the pump 39 is disconnected from the hydraulic system described above while the heads are being adjusted to engage the coil. Magnetic valves 41 and 42 are normally closed but are opened when the pump 39 is operating. One simple arrangement for obtaining this operation is illustrated in Figure 2, assuming that the motor 40 is a direct-current motor and is provided with a reversing panel including a field-winding circuit 43 and an armature circuit 44. The operating coils 41c and 42c of the valves 41 and 42 may be connected across the circuit 43 and are thus energized only when the motor 40 is operating.

An interconnection 45 extends between the inner ends of the cylinders 30 and 31 and is controlled by a magnetic valve 46 having an operating coil 46c in the same manner as the valves 41 and 42, the coil 46c being connected in parallel with the coils 41c and 42c. The outer ends of the cylinders 30 and 31 are connected to opposite sides of the pump 39 through relief valves 47 and 48.

If the coil 32 has been engaged by the heads 26 and 27 as previously explained, and the valves 36 and 37 stand in their illustrated positions, the piston rods of both cylinders may be caused to move simultaneously in the same direction simply by appropriately energizing the motor 40 to drive the pump 39 in one direction or the other. The valves 36 and 37 are preferably provided with spring means for returning them to neutral position when released. This cuts off the pump 33 from the cylinders 30 and 31. This pump would, in any case, be shut down after engagement of the coil by the cone heads. Opening of the valves 41, 42 and 46 on starting the motor 40 establishes a series circuit through the cylinders 30 and 31 and the pump 39 and the direction of rotation of the pump determines the direction of the resulting movement of the piston rods of the cylinders. Relief valves 47 and 48 are arranged to allow fluid to flow to reservoir 35 if excess pressure is built up in the connections between cylinders 30 and 31 and pump 39. These valves are preferably set to open at a pressure only slightly greater than that developed by the pump 33 for shifting the cone heads to cause them to engage the coil initially. By driving the pump 39 in the proper direction for an appropriate time, thus moving both the heads 26 and 27 in the same direction, the coil may be centered with great accuracy and without any danger of dropping it as a result of moving one head at a rate different from that at which the other is adjusted. For moving the coil to the right, for example, the pump 39 should be so driven as to discharge on the left-hand side. Fluid entering the outer end of cylinder 30 moves the piston therein, thereby forcing the fluid in the inner end of the cylinder through the interconnection 45 to the inner end of the cylinder 31. This causes corresponding movement of the piston in the latter and the return of the fluid displaced thereby through the valve 48 to the pump.

When the coil has been properly centered, the pump 39 is stopped and remains shut down until the next coil is to be centered. In order to prevent improper operation, the control system for the motor 40 may be interlocked with that for the motor 34 so that it is impossible to drive the motor 40 while the motor 34 is running.

It will be apparent from the foregoing description that the invention has important advantages in connection with the processing of coiled strip in that it makes possible the rapid and accurate centering of the coil on a coil holder or reel relative to the processing line. The apparatus involved is simple in structure and positive in operation. The degree of accuracy obtainable in the adjustment of the coil may be made quite high by employing pumps and cylinders of suitable relative capacities.

Although I have illustrated and described but two alternative embodiments, it will be recognized that changes in the construction and arrangement illustrated may be made without departing from the spirit of the invention or the scope of the appended claims.

I claim:

1. Apparatus for adjusting a coil-supporting means including axially alined rotatable heads mounted for shifting movement toward and from each other, hydraulic motors for shifting the heads toward and from each other, a pump and control valves for operating the motors individually, a reversible pump and an interconnection between the motors for operating the motors simultaneously in the same direction and valves normally disconnecting the reversible pump from the motors and closing the interconnection.

2. Apparatus for adjusting a coil-supporting means including axially alined rotatable heads mounted for shifting movement toward and from each other, hydraulic motors for shifting the heads toward and from each other, a reversible pump connected to the motors, a pipe interconnecting corresponding ends of the motors whereby operation of the pump causes axial movement of both heads in the same direction and a second pump also connected to the motors, manually operable valves for controlling the motors individually and automatic valves normally disconnecting the reversible pump from the motors and closing the interconnection.

3. Apparatus for adjusting a coil-supporting means including axially alined rotatable heads mounted for shifting movement toward and from each other, hydraulic motors for shifting the heads toward and from each other, a reversible pump connected to the motors, a pipe interconnecting corresponding ends of the motors whereby operation of the pump causes axial movement of both heads in the same direction and a second pump also connected to the motors, manually operable valves for controlling the motors individually, automatic valves normally disconnecting the reversible pump from the motors and closing the interconnection and an electric motor driving the reversible pump and means operating when the electric motor is running to open the last-mentioned valves.

WALTER O. JONES.

REFERENCES CITED

The following references are of record in the file of this patent:

UNITED STATES PATENTS

| Number | Name | Date |
|---|---|---|
| 1,982,685 | Muller | Dec. 4, 1934 |
| 2,066,377 | Wean et al. | Jan. 5, 1937 |
| 2,210,144 | Day | Aug. 6, 1940 |
| 2,250,025 | Klein | July 22, 1941 |
| 2,262,118 | Sieger | Nov. 11, 1941 |
| 2,285,488 | Bernard | June 9, 1942 |